(12) United States Patent
Bruni et al.

(10) Patent No.: US 10,133,895 B2
(45) Date of Patent: Nov. 20, 2018

(54) FIXED POSITION READER OF CODED INFORMATION AND CAMERA BASED CHECKOUT SYSTEM USING THE SAME

(71) Applicant: Datalogic IP Tech S.r.l., Lippo di Calderara di Reno (IT)

(72) Inventors: Davide Bruni, Bologna (IT); Guy L. Johnson, Elmira, OR (US); Robert W. Rudeen, Bologna (IT); Michele Suman, Padua (IT)

(73) Assignee: Datalogic IP Tech S.r.l., Lippo di Calderara di (IT)

( * ) Notice: Subject to any disclaimer, the term of this patent is extended or adjusted under 35 U.S.C. 154(b) by 0 days.

(21) Appl. No.: 15/110,646

(22) PCT Filed: Jan. 9, 2014

(86) PCT No.: PCT/IT2014/000004
§ 371 (c)(1),
(2) Date: Jul. 8, 2016

(87) PCT Pub. No.: WO2015/104724
PCT Pub. Date: Jul. 16, 2015

(65) Prior Publication Data
US 2016/0379027 A1     Dec. 29, 2016

(51) Int. Cl.
*G06K 7/10* (2006.01)
*G06K 7/14* (2006.01)

(52) U.S. Cl.
CPC ....... *G06K 7/10722* (2013.01); *G06K 7/1096* (2013.01); *G06K 7/10544* (2013.01);
(Continued)

(58) Field of Classification Search
CPC ............ G06K 7/1096; G06K 7/10861; G06K 7/10732; G06K 7/10742; G06K 7/10821; G01G 19/4144
(Continued)

(56) References Cited

U.S. PATENT DOCUMENTS 5,444,226 A     8/1995   Collins et al.
6,457,644 B1 * 10/2002  Collins, Jr. ........ G01G 19/4144
                                                   235/462.11
(Continued)

OTHER PUBLICATIONS

International Search Report dated Sep. 24, 2014 in PCT Patent Application No. PCT/IT2014/000004, 2 pages.

*Primary Examiner* — Suezu Ellis
(74) *Attorney, Agent, or Firm* — Shook, Hardy & Bacon, L.L.P.

(57) ABSTRACT

A reader contains a housing with a window having a peripheral rim. The housing has a device for reading coded information which generates a field projecting through the window towards the outside of the housing, and has a device for visually indicating the result to a user. The visual indication device generates an indication appearing substantially at least on the window, on a portion of the peripheral rim of the window, or on a portion of the housing adjoining laterally the peripheral rim of the window. The housing portion is at least on the left side, right side, or below the window. Additionally, a camera based checkout security system includes at least a checkout security camera and a fixed position reader of coded information. The checkout security camera generates a camera field of view directed towards the window of the fixed position reader of coded information.

22 Claims, 8 Drawing Sheets

(52) U.S. Cl.
CPC ..... *G06K 7/10742* (2013.01); *G06K 7/10821* (2013.01); *G06K 7/1413* (2013.01)

(58) Field of Classification Search
USPC .................. 235/462.14, 462.35, 462.42, 473
See application file for complete search history.

(56) References Cited

U.S. PATENT DOCUMENTS

| | | | | |
|---|---|---|---|---|
| 7,407,096 | B2 * | 8/2008 | McQueen | G06K 7/10861 235/375 |
| 2003/0010824 | A1 * | 1/2003 | McQueen | G06K 7/10851 235/462.14 |
| 2006/0054703 | A1 * | 3/2006 | Kahn | G06K 7/10544 235/462.14 |
| 2007/0290043 | A1 * | 12/2007 | Russell | A47F 9/04 235/462.14 |
| 2010/0158310 | A1 * | 6/2010 | McQueen | G06K 9/00 382/100 |
| 2012/0168509 | A1 * | 7/2012 | Nunnink | G06K 7/10732 235/455 |
| 2013/0126618 | A1 * | 5/2013 | Gao | G06K 7/10 235/469 |
| 2013/0299581 | A1 * | 11/2013 | Handshaw | G06K 7/12 235/440 |
| 2015/0060552 | A1 * | 3/2015 | Rambler | G06K 7/10821 235/470 |

* cited by examiner

FIXED POSITION READER OF CODED INFORMATION AND CAMERA BASED CHECKOUT SYSTEM USING THE SAME

CROSS-REFERENCE TO RELATED APPLICATIONS

This application claims priority under 35 U.S.C. § 371 to PCT/IT2014/000004, which was filed on Jan. 9, 2014. The entirety of the aforementioned application is incorporated by reference herein.

TECHNICAL FIELD

The present invention refers to a fixed position reader of coded information and to a camera based checkout system using the same.

BACKGROUND

The reading of coded information is useful, for example, for the handling of products at a point of sale, in a warehouse, at a collection centre, sorting centre or delivery/distribution point, etc.

Throughout the following description and the following claims, the expression: "reading coded information" is used to indicate the acquisition of information related to an object (for example distance, volume, overall dimensions, or object identification data) for example through the acquisition and processing of a light signal diffused by the same object. In this case the term: "coded information" is used to indicate the whole identification data contained in an optical code.

The term: "optical code" is used to indicate any graphical representation having the function of storing coded information. A particular example of optical code consists of the linear or two-dimensional codes, wherein the information is coded through suitable combinations of elements having a predetermined shape, for example squared, rectangular or hexagonal, of dark colour (usually black) separated by clear elements (spaces, usually white), such as barcodes, stacked codes and two-dimensional codes in general, colour codes, etc. The term "optical code" further comprises, more generally, also other graphical patterns either perceptible or imperceptible to the human eye, with information coding function, including clear printed characters (letters, numbers, etc.) and special patterns (such as stamps, logos, signatures, fingerprints, watermarks etc.). The term "optical code" also comprises graphical representations which are detectable not only in the field of visible light but also in the range of wavelengths comprised between infrared and ultraviolet.

Finally, by "indication of the reading result", also the mere indication of the end of the reading, or of the unsuccessful reading attempt, is meant.

For the sake of simplicity of description, hereafter explicit reference will be made to optical code readers (commonly called: scanners).

Optical code readers are of various types; they may be based on laser technology (laser scanners) or imaging technology (imager scanners).

Furthermore, optical code readers may be intended for handheld use (portable readers), or to be fixedly resting in a predetermined position (fixed position readers). Fixed position readers are in turn classified as on-counter and in-counter readers, the former being those typically resting on the top of a surface, which is usually the check counter surface, the latter being commonly integrated in the check counter and oriented so that its reading field projects from the check counter surface towards the user or operator.

On-counter readers are also sometimes referred to as "presentation scanners", due to the fact that the user grabs the object to be identified, typically a good or a document of any type, and moves her/his hand towards the terminal reading face, thus "presenting" the object to be read to it.

In-counter readers are also sometimes called "flatbed scanners", because the reading window lies flush with the counter surface, or, "vertical scanners" when the reading window lies in a substantially vertical plane facing the operator, or else, "bi-optic scanners" when both configurations—flatbed and vertical—are simultaneously present.

A laser on-counter reader according to the prior art is described in U.S. Pat. No. 6,719,201 and U.S. Pat. No. 7,059,529, and an in-counter retail reader according to the prior art is disclosed in U.S. Pat. No. 8,322,621.

As known, in optical code reading, it is important to give the user a clear and unmistakable feedback of the success/failure of the decoding operation. In fact, the operation of reading a particular optical code can give negative results for various reasons, among which the imperfection of the code due, for example, to damages to the label on which it is obtained, the distance between the reader and the code, or the variation of said distance during the scanning time. In addition, even when the code is correctly acquired, its decoding may result impossible because, for example, it does not fall within the categories of codes recognized by the reader. In any case, the user needs to know whether the code has been decoded before proceeding to read another code.

Simple acoustic, tactile or visual feedback means are already known and currently used for indicating to the user that the particular aimed optical code has been decoded by the reader.

The Applicant realized that the acoustic signal generated by the known acoustic feedback means cannot be easily heard if the operation is carried out in a noisy environment or by an operator with auditory deficiency. Moreover, a frequently repeated acoustic signal may be annoying for the operator who must carry out very frequent readings and/or for a long time interval.

Furthermore, the Applicant noticed that tactile feedback is not suitable for hands free operation.

The Applicant focused its attention to fixed position readers providing a visual feedback of the success/failure of the decoding operation.

It is known to provide a visual feedback by using a light source arranged on the reader body which flashes with green light in case a reading has correctly occurred. In detail, in on-counter and vertical in-counter code readers it is known to position said light source on the upper surface of their body.

FIG. 1 shows by way of an example an on-counter reader 100 according to the prior art provided with a device for visually indicating the reading result which generates a visual indication light 101 appearing on the upper surface 102 of its body 103, with reference to its operating position when installed on a check counter.

The Applicant has considered where the operator focuses his/her attention during operation, based on psychological factors, as described for example in:

"Eye Movements in Reading and Information Processing: 20 Years of Research", Keith Rayner, University of Massachusetts at Amherst, Psychological Bulletin 1998, Vol. 124, No. 3, 372-422

Walter Gilmore, "The user—computer interface in process control: A human factors engineering handbook", Elsevier Science, Jan. 1, 1989—Technology & Engineering—456 pages Bedard P, Proteau L. "Movement planning of video and of manual aiming 30 movements.", Spat Vis. 2005; 18(3):275-96.

Bedard P, Proteau L., "On the role of static and dynamic visual afferent information in goal-directed aiming movements.", Exp Brain Res.2001 June; 138(4):419-31.

The Applicant observed that, when bringing an object into the reading field of the reader 100, the visual indication light 101 on the upper surface 102 of the reader body 103 is normally outside of the user's visual cone, whose gaze is usually focused precisely on the object itself and on the reading window 105, namely the opening from which the reading field is projected towards the outside of the reader 100.

In fact, the Applicant observed that, while using fixed position readers, the user's gaze first meets the object to be scanned, and, immediately behind it, the reading window, which is not the primary focus of the user's eye, and so is perceived in its entirety as a background object, while eyes are focused on the object to be scanned, which is generally held with a hand.

More specifically, the Applicant found that the sequence followed by the user's eyes and brain is the following: the user's gaze is first focused at the object being presented to the reading window and the hand holding it; then, the eye attention is transferred towards the reading window in order to mentally draw the desired hand trajectory; thereafter, the hand is moved towards the window in order to reach the position for reading; finally, when reading occurs, the eye visual cone embraces mainly the area delimited by the window surrounding the object.

Thus, according to the Applicant, the zone where visual acuity is maximum is on the object, namely where the brain attention is focused, and the reading window lying behind the object, which is comprised within the peripheral zone of the visual cone. Indeed, the reading window is perceived by the user as a background object which instinctively guides the user's gaze to the position where the object has to be moved.

In view of the above, a visual indication as that provided by the visual indication light 101 on the upper surface 102 of the reader body 103 of FIG. 1, being outside of the user's visual cone, requires a non-spontaneous eye movement in order to be perceived by the user, since the attention of the user is not instinctively captured thereby.

In addition thereto, the user's attention would be captured only if the emitted visual indication light is very bright and this could not occur in an intensively illuminated environment.

Furthermore, the Applicant noticed that the user's line of sight towards the visual indication light 101 can be blocked by the checker keyboard or monitor which are usually placed very close by and above the reader body.

The Applicant thus found that traditional indicator lights placed on top of the reader body are of little help, as they are hidden by the structure where the reader is mounted, or placed at a position the user does not instinctively look at.

For this reason, an indicator light placed on top of the reader body cannot be considered to achieve an effective indication of the success/failure of the decoding operation. This also applies for the area directly above and adjoining the reading window which is generally also covered by the checker keyboard or monitor.

The Applicant realized that in order to achieve an effective visual feedback it is crucial to instinctively capture the attention of the user and that this is obtained when the visual indication is within the user's visual cone and when the visual indication in not obstructed by any object.

Furthermore, in stores where a camera based checkout security system is installed, it is necessary that each checkout security camera of the system reliably detects the visual feedback of the respective fixed position reader in order to check if a read has effectively occurred. This is not assured e.g. in case the indicator lights are placed on top of the reader body since the camera field of view may be blocked by the checker keyboard or monitor.

The Applicant considered the problem of providing a fixed position reader of coded information capable of reliably giving a visual feedback to the user and/or to a checkout security camera of the success/failure of the decoding operation which is immediately perceptible by the user, namely which does not even require a slight movement of the user's eye in order to be perceived, even in those cases when the reader has to be installed in very little space underneath the check counter keyboard or monitor.

The Applicant realized that, when the object is placed at the reading window or passed over the reading window in order to acquire and read the coded information of the object, at least a portion of the reading window or at least some of the areas adjoining laterally the reading window on its left and/or right hand side and/or adjoining the reading window from below are generally freely accessible to the user's sight.

BRIEF SUMMARY

Throughout the present description and the following claims, the left and right hand sides of the reading window are defined with respect to the operating position of the fixed position reader when installed in a check counter, and from the point of view of the user which sees the reading window in front of her/him with a predefined and precise orientation when being at her/his operating position at the check counter. Analogous definitions apply in this description and in the claims, when reference is made to the areas adjoining the reading window from above and/or below.

A first aspect of the present invention therefore relates to a fixed position reader of coded information according to claim 1; preferred features of the fixed position reader of coded information are defined in the dependent claims.

In detail, the invention provides for a fixed position reader of coded information comprising a housing provided with a reading window having a peripheral rim, said housing comprising:

a device for reading coded information which generates a reading field projecting through the reading window towards the outside of the housing, and a device for visually indicating the reading result to a user, characterized in that said visual indication device generates a visual indication appearing substantially on the reading window and/or on at least a portion of the peripheral rim of the reading window and/or on at least a portion of the housing adjoining laterally the peripheral rim of the reading window, said housing portion being on the left and/or right hand side of the reading window and/or below the reading window.

Advantageously, the fact that the visual indication appears on the reading window or in an area directly surrounding the reading window assures that the visual indication of the reading result is effectively perceived by the user.

In fact, at the moment the reading is performed, the user's line of sight is directed towards the object lying within the reading field of the fixed position reader so that the reading window is perceived by the user in its entirety as a background object and the window rim and the housing portions adjoining the window rim lie in the peripheral zone of the user's visual cone, but still well within it.

Thus, the so positioned visual indication is perceived by the user without the necessity of any eye movement.

In addition thereto, the fact that the visual indication appears on the reading window or in an area directly surrounding the reading window but not arranged on the top of the reading window assures that this area is not covered by the checker keyboard or monitor, or by the arms of the users.

The above embodiments of the fixed position reader of coded information can be further improved by the following additional features which can be unrestrictedly and independently combined with each other.

Preferably, the visual indication appears on the entire peripheral rim of the reading window.

This makes sure that the visual indication is clearly perceived by the user irrespective of the positions of the object and/or user's arms and/or keyboard or monitor of the check counter.

Furthermore, it is also achieved that the visual indication distracts the user from staring for too long at the reading light (laser or flash) so as to interrupt continuous exposure to the reading light.

More preferably, the visual indication device comprises at least one light source which generates a light beam guided through a light guide around at least a portion of the peripheral rim of the reading window.

In an alternative embodiment, the visual indication device comprises a plurality of light sources disposed behind a diffusive screen peripherally surrounding at least a portion of the reading window at its peripheral rim.

According to a further advantageous alternative embodiment, the visual indication device comprises at least one light source which generates a light beam directed at a plurality of separated diffusing areas placed peripherally with respect to the reading window at its peripheral rim.

In all these alternative ways, a visual indication appearing on at least a portion of the window rim is easily and effectively achieved.

Preferably, the visual indication appears on two portions of the housing adjoining laterally the peripheral rim of the reading window, a first housing portion being on the left hand side of the reading window and a second housing portion being on the right hand side of the reading window.

In this way, it is avoided that the visual indication is hidden by the object bearing the coded information to be read which, during the reading operation, is held by the user in front of the reading window thereby partially covering the reading window and the area directly above and/or below the same. This makes sure that the visual indication is perceived by the user.

Also in this case it is further achieved that the visual indication distracts the user from staring for too long at the reading light (laser or flash) so as to interrupt continuous exposure to the reading light.

More preferably, the visual indication device comprises at least one light source which generates at least one light beam directed toward a couple of diffusive strips, a first diffusive strip being on the left hand side of the reading window and a second diffusive strip being on the right hand side of said reading window.

Even more preferably, the strips are made of a diffusive material or comprise a diffusive layer, and the visual indication device comprises at least one light source emitting a light beam towards the strips.

In this way, a visual indication appearing on two portions of the housing adjoining laterally the rim of the reading window, on its left and right hand side, is easily and effectively achieved.

Alternatively, the visual indication appears on a central portion of the reading window.

This is particularly advantageous in light of an optimization of the readers structure, in those cases where the central portion of the reading window is not used for light collection purposes, such as is often the case with laser scanners; this solution may also be used for imaging scanners, as long as visual indication is not simultaneous to image acquisition, which is almost always the case.

Preferably, the visual indication device comprises at least one light source oriented so as to generate a light beam for collimated or moderately diverging and having an optical path directed towards the central portion of the reading window.

In this way, a visual indication appearing on the central portion of the readingwindow is easily and effectively achieved.

More preferably, the central portion of the reading window is made diffusive, e.g. by integrating a diffusive material in it or applying a diffusive layer on it.

In so doing, the light beam emitted by the visual indication device makes the central portion of the reading window glow, thus making the visual indication clearly visible to the user.

According to a further advantageous alternative, the visual indication appears on the whole of the reading window.

Preferably, the visual indication consists in the change in color of the whole reading window, which can be easily perceived by the user whose line of sight is directed towards the reading window, at the moment the reading is performed. Preferably, the visual indication device comprises at least one light source emitting a light beam towards the reading window along any optical internal path not interfering with an emission or collection optical path of the device for reading coded information during scanning and/or image acquisition operations.

In this way, a visual indication appearing on the whole of the reading window is easily and effectively achieved.

Preferably, the visual indication appears in a pulsating mode during the reading operation of the device for reading coded information; alternatively, the visual indication appears temporally cycling through a sequence of different colors during the reading operation of the device for reading coded information.

In this way the eye is kept from fixedly staring at the intense laser or LED flashlight used for reading. This avoids the user focusing its maximum acuity visual cone area in the zone where the most intense reading light is shed. This may also be helpful to increase the perception of a change in color for users suffering from color blindness or green/red color blindness; multi-color strobing would aid people that suffer from this condition.

Preferably, the visual indication device comprises at least one multicolor light source.

In this way, further visual indications can be achieved, in addition to the visual indication of the reading result. By way of an example, the idle state is shown by a first color, whereas the reading result is indicated by changing the first color into a second color.

Preferably, the visual indication has a color different from the color of a light emitted by the device for reading coded information.

In this way, attention is effectively captured by the actual presence of a source of light of a different color and within the user's visual cone.

A further aspect of the present invention relates to a camera based checkout security system comprising at least a checkout security camera and a fixed position reader of coded information as previously described, wherein the checkout security camera generates a camera field of view directed towards the reading window of the fixed position reader of coded information.

Advantageously, the fact that the visual indication of the reading result appears on the reading window or in an area directly surrounding the reading window but not arranged on the top of the reading window makes it easier for the checkout security cameras to see if a read has occurred for security reasons.

In addition, if the fixed position reader is mounted with its reading window vertically oriented, the so conceived visual indication can be projected with an inclination that causes it to hit onto a surface of the checkout counter which lies in the field of view of the checkout security cameras. This would double the probability that the visual indication of the reading result is captured by the camera.

BRIEF DESCRIPTION OF THE DRAWINGS

With reference to the attached drawings, further features and advantages of the present invention will be shown by means of the following detailed description of some of its preferred embodiments. According to the above description, the several features of each embodiment can be unrestrictedly and independently combined with each other in order to achieve the advantages specifically deriving from a certain combination of the same.

In the said drawings:

FIG. 3b is a side view of the fixed position on-counter reader of coded information of FIG. 3a;

DETAILED DESCRIPTION

In the following description, the discussion of the figures will be made by means of reference signs which will be the same for constructional elements having the same function.

With reference to FIGS. 2-7, a fixed position reader of coded information according to the invention is shown which is indicated as a whole with the reference number 10.

Figure 1:
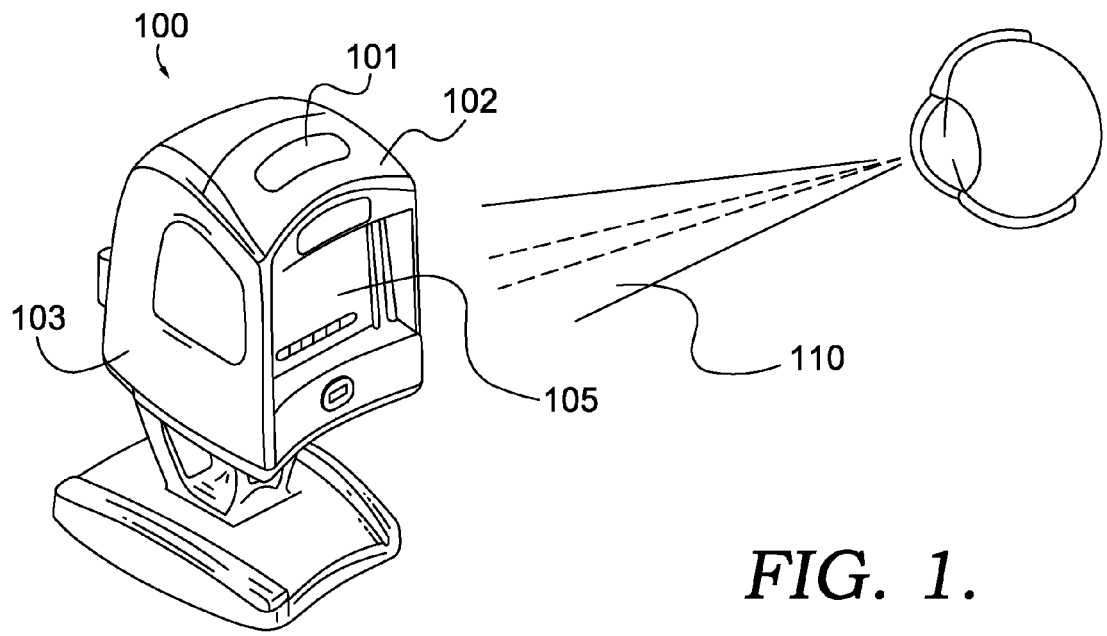
FIG. 1 is a schematic representation of a fixed position on-counter reader of coded information according to the prior art and of the field of view of a user when bringing an object into the reading field of the said reader.
Figure 2A:
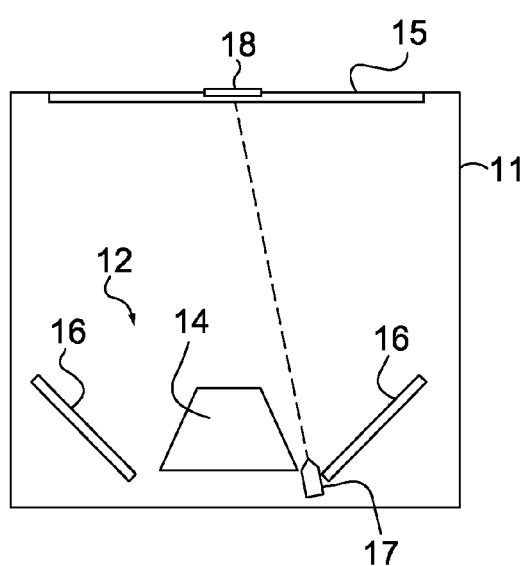
FIG. 2a is a schematic cut view of the internal components of a fixed position on-counter reader of coded information according to a first embodiment of the present invention.

The fixed position reader of coded information 10 comprises a housing 11 provided with a reading window 15. As shown in FIG. 2a, a device for reading coded information 12 is provided inside the housing 11.

The device for reading coded information 12 generates a reading field (not shown) projecting through the reading window 15 towards the outside of the housing 11. The device for reading coded information 12 can be based on either laser or LED illumination technology. For clarity sake, in the following description only a device for reading coded information based on laser technology as shown in detail in FIG. 2a will be described. However, the principles of the invention are applicable mutatis mutandis to fixed position readers using device for reading coded information based on LED illumination technology.

The device for reading coded information 12 comprises at least one source of light beams (not shown), a scanning device for scanning the laser light beams on the coded information to be read.

Figure 2B:
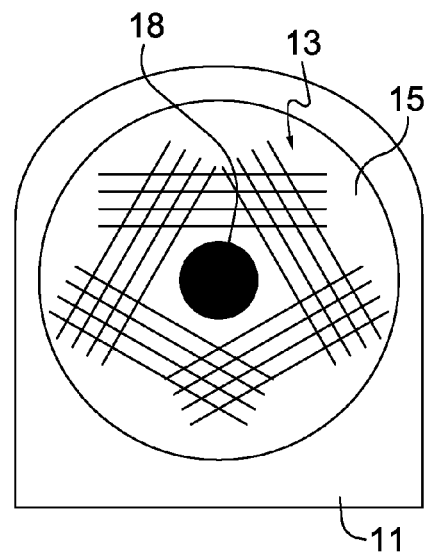
FIG. 2b is a front view of the fixed position on-counter reader of coded information of FIG. 2a when visually indicating the reading result.

As shown in FIGS. 2a and 2b, the scanning device comprises a rotating polygon mirror 14 on which the laser beams are incident for generating a multi-line laser scan pattern 13 inside the housing 11, thereby generating the reading field of view. In the specific example of FIGS. 2a, between each light source and the polygon mirror 14 there are one or more deflecting mirrors 16 of the laser light emitted by the light source arranged around the rotating polygon mirror 14 for generating the laser line pattern 13.

Furthermore, the device for reading coded information 12 usually comprises a photo-receiver device (not shown) adapted to collect the light diffused by the illuminated coded information and to generate an electrical signal proportional to the intensity of the collected light and a device (not shown) for processing the aforementioned electrical signal adapted to provide the sequence of the decoded data of the coded information read.

In addition, the fixed position reader of coded information 10 comprises a visual indication device including at least one light source 17 made to generate a light beam for visually indicating to a user the reading result.

As shown in FIG. 2*a*, the light source 17 is preferably placed inside the housing 11 and oriented so as to generate a visual indication 18 of the reading result appearing substantially on the reading window 15. Therefore, the light source 17 preferably generates a collimated or moderately diverging beam of light, whose emission path is directed towards the reading window 15.

The collimated beam is preferably generated according to any of the ways described in EP 1 128 315 of the same Applicant.

Preferably, the emission path is directed towards a central portion of the reading window 15 which is typically not used for light collection purposes.

More preferably, the central portion of the reading window 15 is made diffusive, e.g. by integrating a diffusive material in it or applying a diffusive layer on it in any known manner, so that the light beam emitted by the light source 17 generates on the reading window 15 a glowing visual indication 18 of the reading result clearly visible to the user.

The glowing visual indication 18 according to FIG. 2*b* has a circular shape. However, in alternative embodiments, the glowing visual indication 18 appearing on the reading window 15 has any suitable shape which can be generated, e. g. the shapes described in EP 1 128 315 of the same Applicant.

FIGS. 2*a* and 2*b* show an on-counter fixed position reader 10 with a housing 11 having a flat shaped bottom in order to allow the fixed position reader 10 to rest on a counter surface.

Figure 3A:
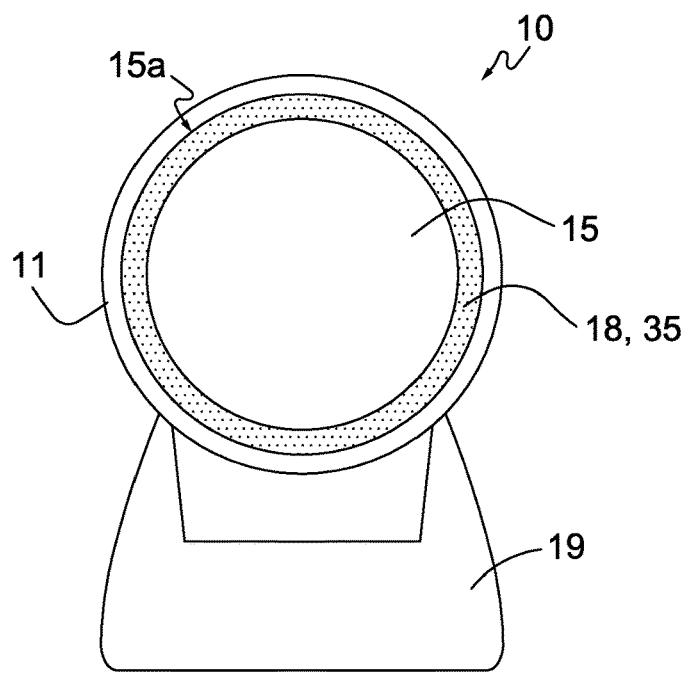
FIG. 3a is a front view of the fixed position on-counter reader of coded information according to a second embodiment of the present invention when visually indicating the reading result.
Figure 3B:
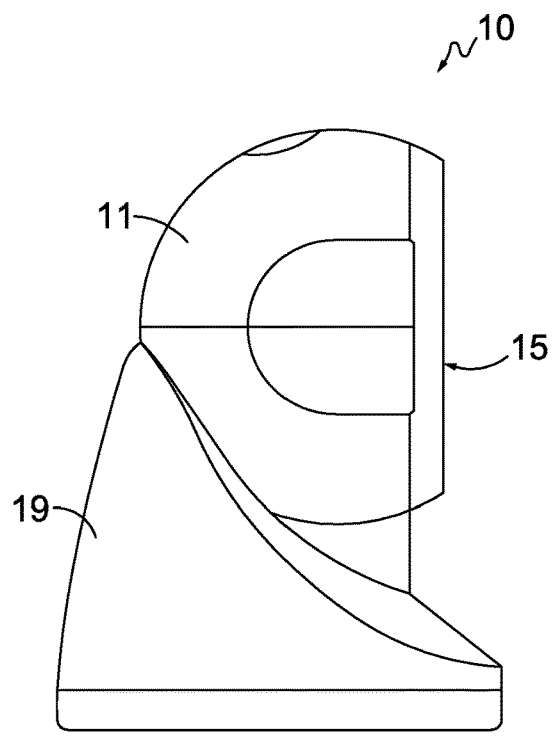

FIGS. 3*a* and 3*b* show a second embodiment of an on-counter fixed position reader of coded information 10 according to the present invention.

The housing 11 of the fixed position reader 10 of FIGS. 3*a* and 3*b* comprises a support 19 which allows the fixed position reader 10 to rest on a counter surface.

Preferably, the support 19 can be orientated so as to direct the reading window 15 where the user deems it most convenient.

In the embodiment shown in FIGS. 3*a* and 3*b*, the visual indication 18 of the reading result appears on at least a portion of a rim 15*a* of the reading window 15. This second embodiment is particularly suitable for readers which do not use the peripheral part of the reading window for collecting the light backscattered by the coded information.

In the embodiment illustrated, the visual indication 18 of the reading result appears on the whole rim 15*a* of the reading window 15 in order to be clearly visible to the user.

The visual indication 18 is achieved by means of a visual indication device comprising one or more light sources (not shown) which generate a light beam guided through a light guide assembly 30 extending around the whole rim 15*a* of the reading window 15.

Alternatively, the light guide extends around just a portion of the rim 15*a*.

Figure 3C:
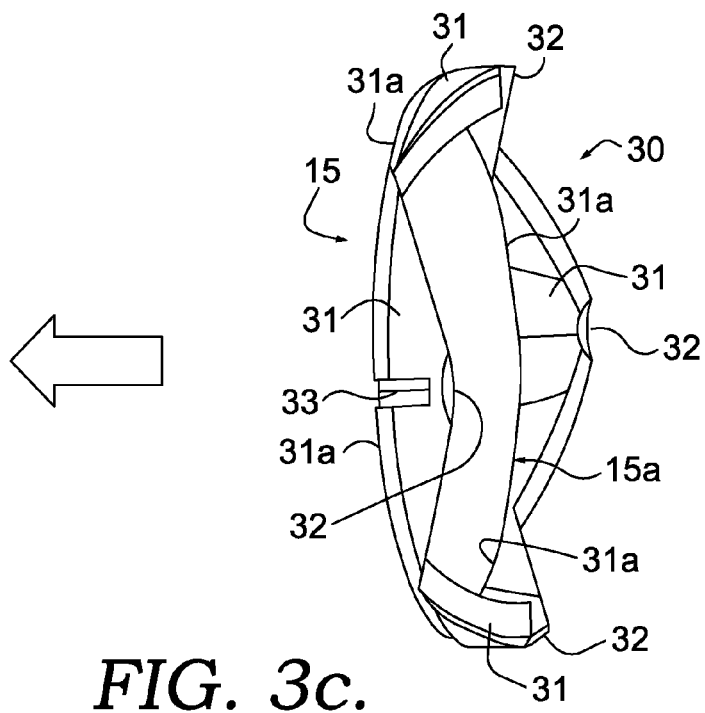
FIGS. 3c and 3d are schematic perspective views of a first and a second embodiment of light guides used in connection with the fixed position on-counter reader of coded information of FIGS. 3a and 3b.
Figure 3D:
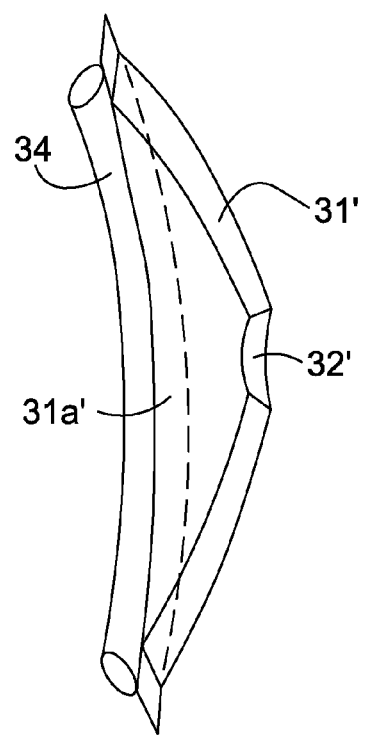

FIG. 3*c* shows a first embodiment of a light guide assembly 30 which can be used in connection with the on-counter fixed position reader 10 of FIGS. 3*a* and 3*b*. The light guide assembly 30 is placed behind an annular screen 35 positioned at the peripheral rim 15*a* of the reading window 15. The light guide assembly 30 of FIG. 3*c* comprises four light guides 31 each formed by a solid body having the shape of a truncated frustum or an optically equivalent shape, wherein the basis 31*a* of the body is the emitting surface of the light guide 31 and the light is emitted substantially in the direction of the white arrow depicted in the drawing.

It is clear that the number of light guides 31 composing the light guide assembly 30 can be different from four and is preferably, six or eight.

A first light source (not shown) is associated with each light guide 31 so as to have its emitting axis substantially coincident with the axis of the frustum body and directed towards a first inlet surface 32 of the light guide 31 placed on top of its frustum body.

Preferably, the first inlet surface 32 is concave or prismatic so as to increase the emission angle of the light source.

A second light source (not shown) is associated with each light guide 31 so as to have its emitting axis substantially comprised within the plane of the reading window 15 and directed towards a second inlet surface 33 of the light guide 31 placed laterally with respect to its frustum body.

Preferably, also the second inlet surface 33 is concave or prismatic so as to increase the emission angle of the light source.

Associated with each guide light 31 there are preferably the first, the second or both light sources.

In case both light sources are associated with each light guide 31, the first light source preferably has a color different from the color of the second light source.

In an alternative embodiment shown in FIG. 3*c*, each light guide 31' is formed by a hollow body having the shape of a truncated frustum or an optically equivalent shape.

The light guide 31' has an inlet opening 32' placed on top of its frustum body.

A part from the basis 31*a*' of the hollow body, its internal surfaces are preferably coated with a diffusing and/or reflective layer (not shown) which generates a multiple reflection and diffusion effect, or alternatively directly made (e.g. molded) using a white diffusing material.

Preferably, the basis 31*a*' of the hollow body is open and a rubber diffusing element 34 is placed in front of the same in order to spread the emitted light. Alternatively, the basis of the hollow body is transparent and has a roughness sufficient to confer to it diffusive properties.

In an alternative embodiment (not shown), the rim 15*a* can be illuminated by a visual indication device comprising a plurality of light sources (not shown) disposed behind a diffusive, translucent annular screen 35 surrounding the reading window 15 so as to produce a substantially uniformly illuminated rim 15*a* (or a substantially uniformly illuminated portion of rim 15*a*).

By way of a further alternative, the visual indication device comprises at least a light source which generates a beam of light directed at one or more distinct diffusing areas placed peripherally with respect to the reading window 15 but always at its rim 15*a*.

In general, any means suitable to produce a substantially uniformly illuminated ring or portion of ring of light or diffusing illuminated areas around the reading window 15 at the rim 15*a* thereof is suitable.

The visual indication device preferably comprises multicolor light sources such as LEDs in order to achieve further visual indications, in addition to the visual indication of the reading result.

By way of an example, in idle state the window rim 15*a* has a first color (e.g. blue) which indicates that the reader is working. When a reading result has to be indicated, the window rim 15*a* changes to a second color (e.g. green for a successful reading).

Figure 4A:
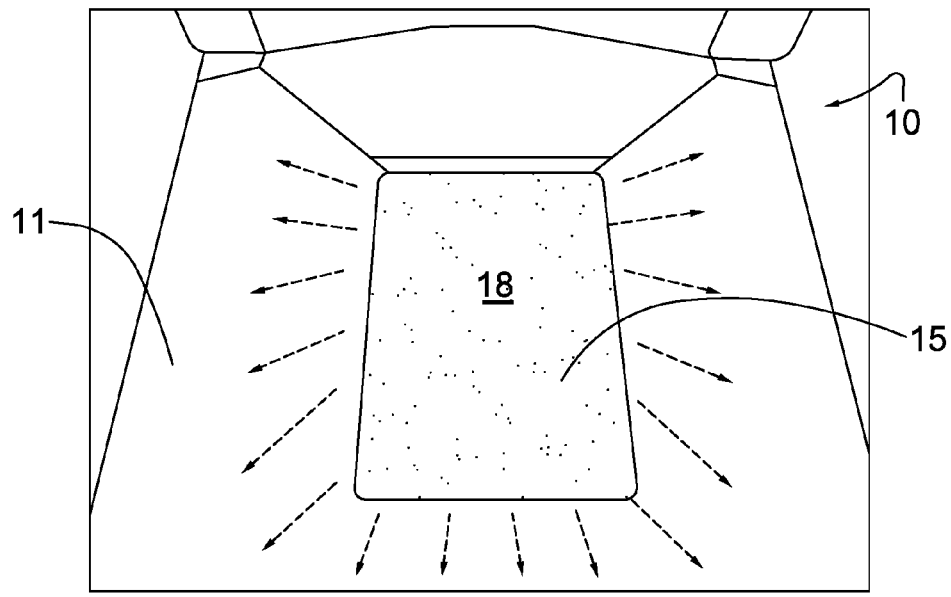
FIG. 4a is a schematic view from above of a fixed position horizontal in-counter reader of coded information according to a third embodiment of the present invention when visually indicating the reading result.
Figure 4B:
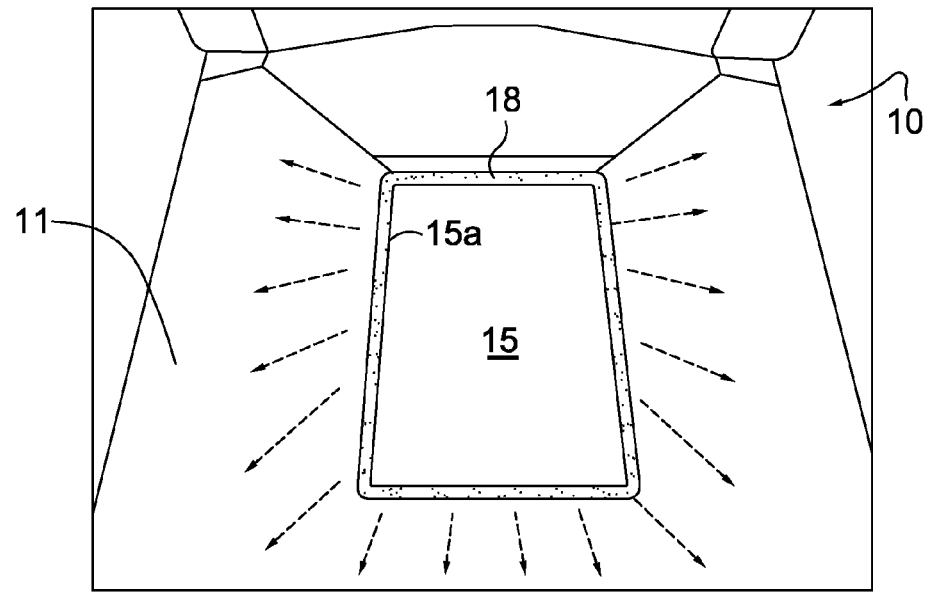
FIG. 4b is a schematic view from above of a fixed position horizontal in-counter reader of coded information according to a fourth embodiment of the present invention when visually indicating the reading result.
Figure 4C:
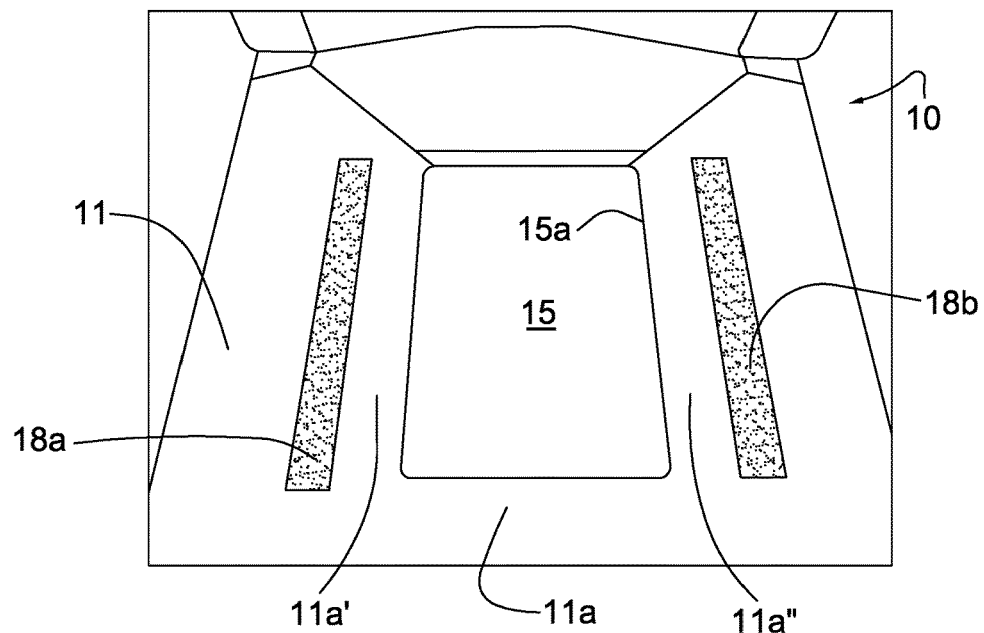
FIG. 4c is a schematic view from above of a fixed position horizontal in-counter reader of coded information according to a fifth embodiment of the present invention when visually indicating the reading result.

FIGS. 4a to 4c show three different embodiments of horizontal in-counter fixed position readers of coded information 10 according to the present invention. According to the embodiment of FIG. 4a, the visual indication 18 of the reading result appears on the whole of the reading window 15 which "glows" after reading has been effected. This embodiment is particularly suitable for imager scanners. This is achieved by means of a visual indication device comprising a light source (not shown) placed internally to the housing 11 and emitting from below a light beam towards the reading window 15 along any optical internal path not interfering with the reading/scanning path.

The emitted light beam is of a color (e.g. green) indicating successful reading and different from that used for reading so that, upon successful reading, the reading window 15 appears substantially uniformly and differently colored.

According to the embodiment of FIG. 4b, the visual indication 18 of the reading result appears on the whole rim 15a of the reading window 15.

This is achieved analogously as described with reference to the embodiment of FIGS. 3a and 3b e.g. by means of a visual indication device comprising a single light source guided through a light guide around the rim 15a of the reading window 15 or a plurality of light sources disposed behind a diffusive, translucent annular screen surrounding the reading window 15.

According to the embodiment of FIG. 4c, the visual indication 18 of the reading result appears on two portions 11a', 11a'' of the housing 11 which adjoin laterally the rim 15a of the reading window 15 and are on the left and right hand sides of reading window 15, respectively.

In the embodiment of FIG. 4c, the visual indication 18 comprises a couple of luminous strips, a first luminous strip 18a appearing on the left hand side of the reading window 15 and a second luminous strip 18b appearing on the right hand side of the reading window 15.

In an alternative embodiment not shown in the drawings, the visual indication 18 of the reading result appears on a portion 11a of the housing 11 which adjoins laterally the window rim 15a and is placed below the reading window 15.

FIGS. 5a to 5d show four different embodiments of vertical in-counter fixed position readers of coded information 10 according to the present invention. According to the embodiment of FIG. 5a, the visual indication 18 of the reading result appears substantially on the reading window 15 and preferably on a central portion of the reading window 15. The central portion of the reading window 15 is preferably made diffusive, as likewise discussed with reference to the on-counter fixed position reader of FIGS. 2a and 2b.

Figure 5A:
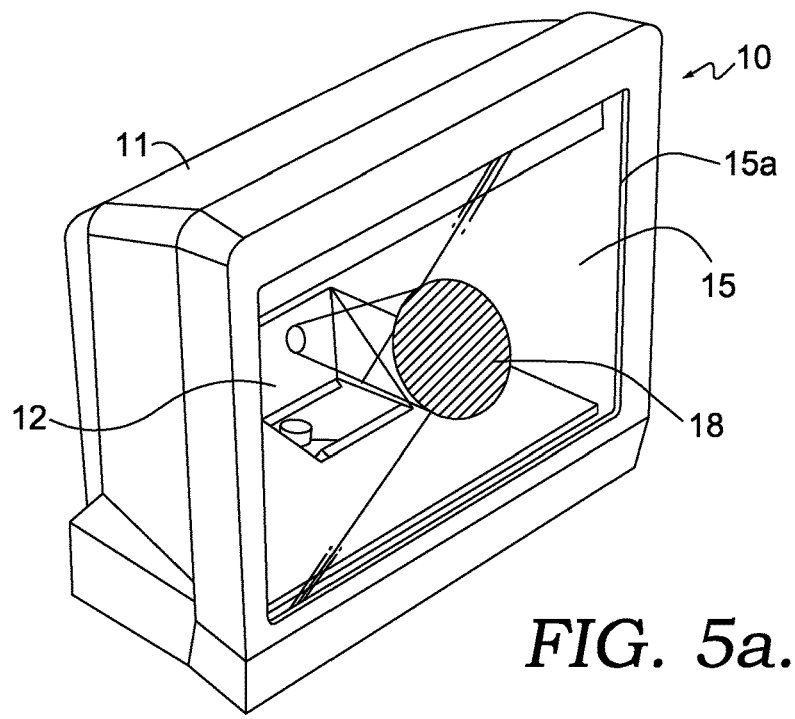
FIGS. 5a to 5d are perspective views of a fixed position vertical in-counter reader of coded information according to further embodiments of the present invention when visually indicating the reading result.
Figure 5B:
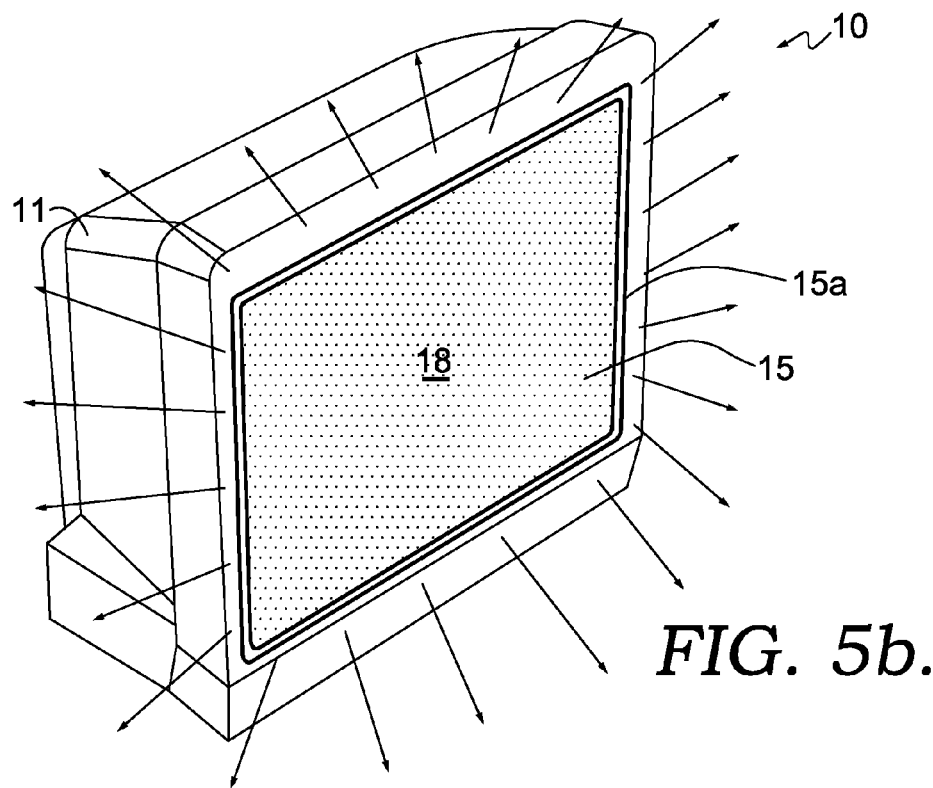

The visual indication 18 of the embodiment of FIG. 5b is shown on the whole of the reading window 15 by making it "glow" after reading has been effected. This is achieved in a similar way as described with reference to the embodiment of FIG. 4a. Preferably, the reading window 15 "glows" of a color different from that used for reading.

Figure 5C:
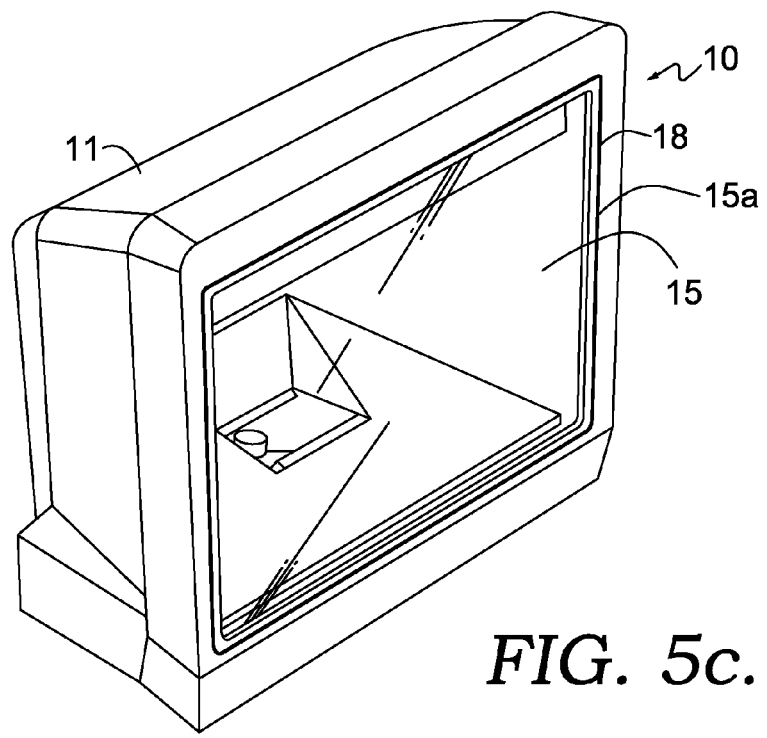

According to the embodiment of FIG. 5c, the visual indication 18 of the reading result appears on the whole rim 15a of the reading window 15. This is achieved analogously as described with reference to the embodiments of FIGS. 3a, 3b, 3c and 4b.

Figure 5D:
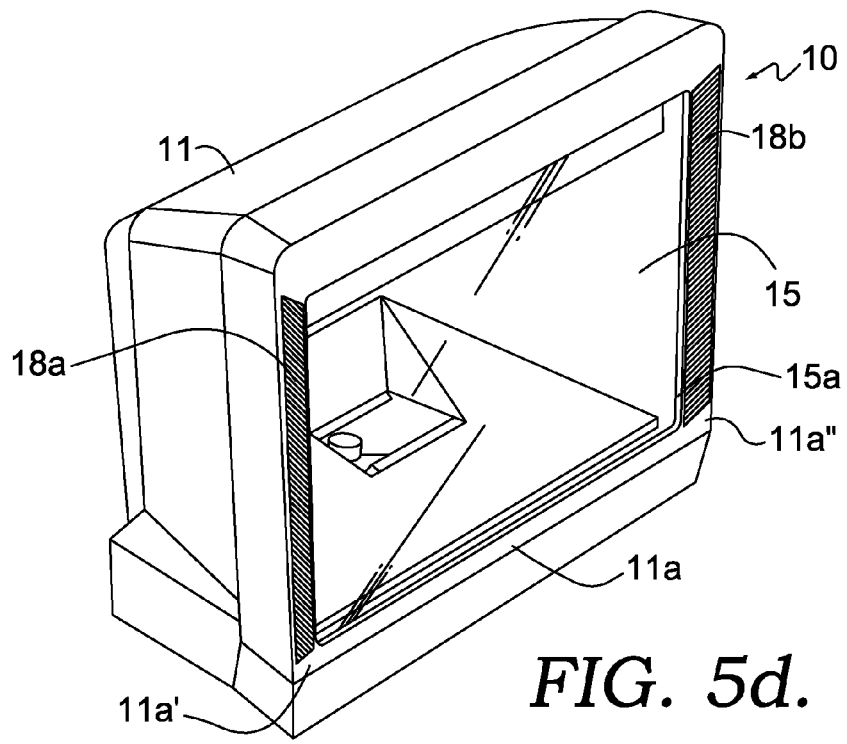

According to the embodiment of FIG. 5d, the visual indication 18 of the reading result appears on two portions 11a', 11a' of the housing 11 which adjoin laterally the rim 15a of the reading window 15 and are on the left and right hand sides of reading window 15, respectively. This is achieved as also described with reference to the embodiment of FIG. 4c.

In an alternative embodiment not shown in the drawings, the visual indication 18 of the reading result appears on a portion 11a of the housing 11 which adjoins laterally the window rim 15a and is placed below the reading window 15.

Figure 6:
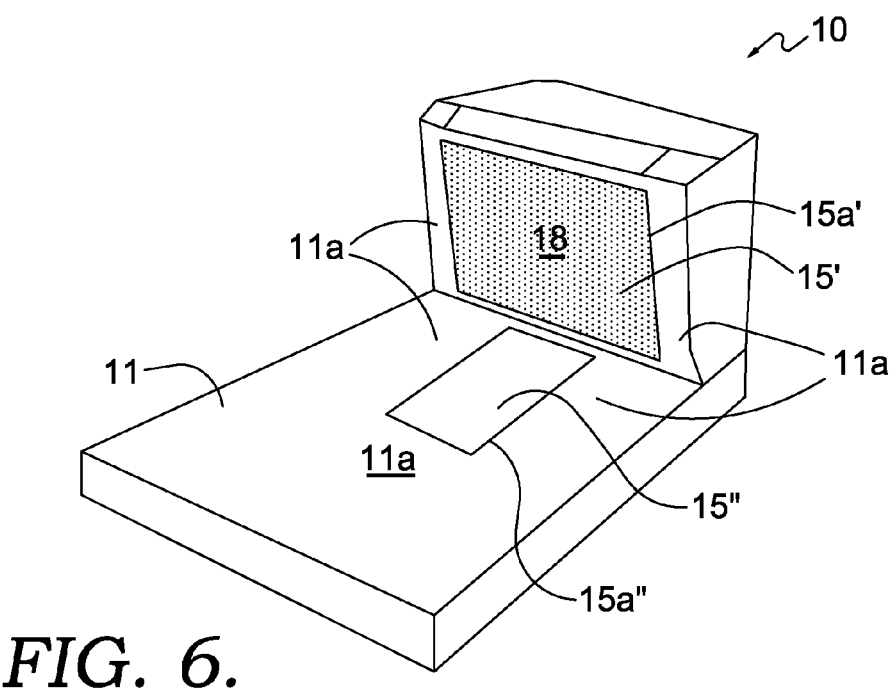
FIG. 6 is a schematic perspective view of a fixed position bi-optic in-counter reader of coded information according to a another embodiment of the present invention when visually indicating the reading result.

FIG. 6 shows an embodiment of a bi-optic in-counter fixed position reader of coded information 10 according to the present invention.

According to the embodiment of FIG. 6, the visual indication 18 of the reading result appears on the whole of the vertical reading window 15' and is achieved in an analogous way as described with reference to the embodiment of FIG. 4a. Alternatively, it is possible that the visual indication 18 of the reading result appears on both the vertical 15' and the horizontal 15'' reading windows or on the horizontal 15'' reading window only, by letting the whole surface of the windows 15',15'' glow or by glowing just a portion of the windows 15', 15''.

Analogously, in alternative embodiments, the visual indication 18 of the reading result is generated by illuminating at least one of the window rims 15'a, 15''a or at least a portion 11a of the housing 11 adjoining laterally the window rims 15'a, 15''a and being placed on the left and/or right hand side of at least one of the reading windows 15', 15'' and/or below the same 15', 15''.

In general, every embodiment of vertical and/or horizontal in-counter fixed position reader above described can be unrestrictedly and independently combined with each other in order to obtain a bi-optic in-counter fixed position reader of coded information 10 according to the present invention.

Figure 7:
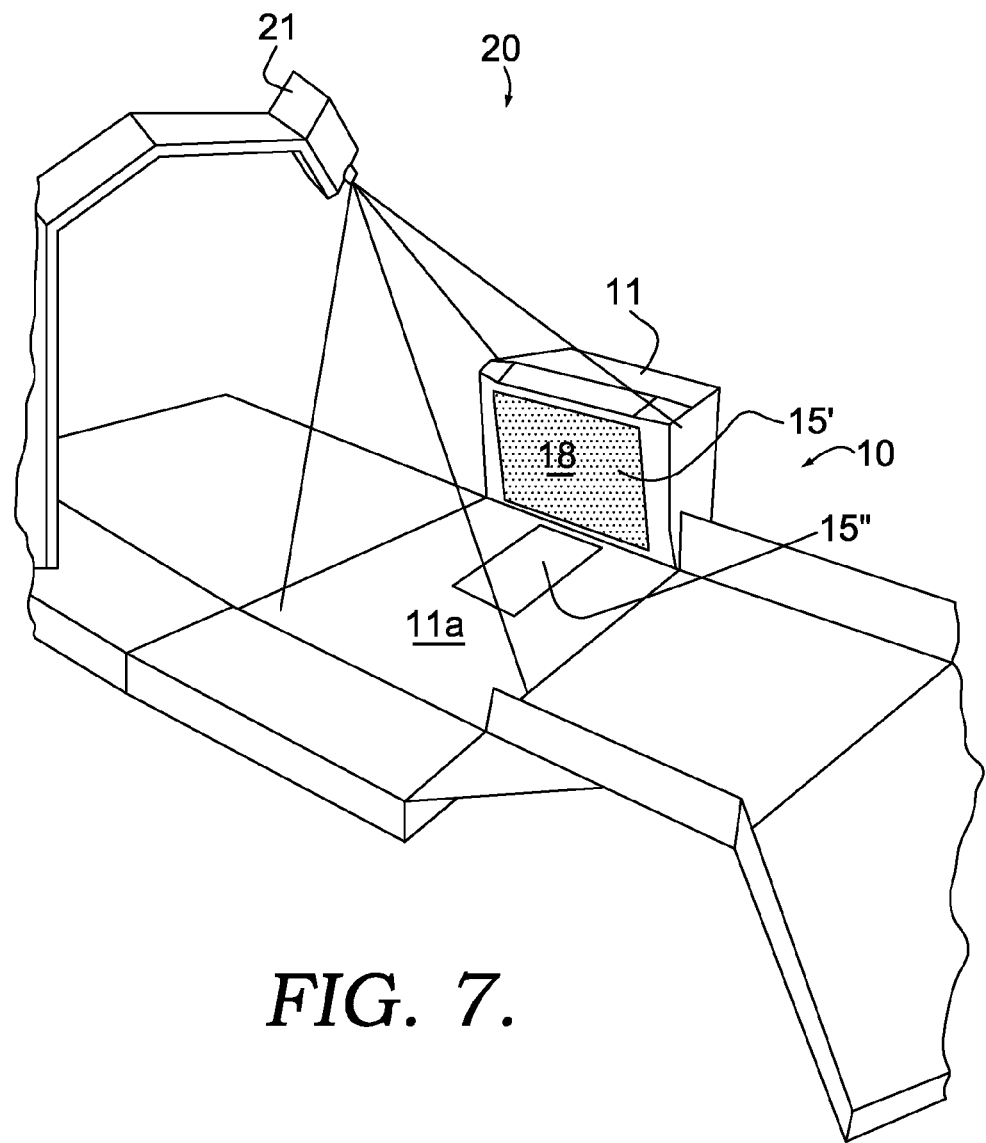
FIG. 7 is a schematic perspective view of an embodiment of a camera based checkout system according to the present invention.

FIG. 7 shows a camera based checkout security system 20, comprising a security checkout camera 21, e.g. a color camera, and a fixed position reader 10 of coded information according to the present invention.

The security checkout camera 21 is installed so that the camera field of view generated by the same is directed towards the reading window 15 of the fixed position reader 10 in order to frame the reading window and the area directly adjoining the same.

Since the framed area is usually not hidden by the checker keyboard or monitor, it is mainly assured that a visual indication appearing substantially on the reading window 15 and/or on at least a portion of the peripheral rim 15a of the reading window 15 and/or on at least a portion 11a,11a', 11a' of the housing 11 adjoininlaterally the peripheral rim 15a of the reading window 15 is reliably captured by the security checkout camera 21.

The functioning of the fixed position reader of coded information 10 according to the invention is the following.

Upon successful and/or unsuccessful reading, a visual indication 18 of the reading result is generated by the visual indication device 17.

Dependent on the specific embodiment, the visual indication 18 appears on a portion of or the entire reading window 15 and/or on at least a portion of its rim 15a and/or on a portion 11a of the housing 11 adjoining the window rim 15a and placed on the right or left hand side of or below the reading window 15.

This assures that the visual indication 18 of the reading result appears within the visual cone of the user. In fact, at the moment the reading is performed, the user's line of sight is directed towards the object lying within the reading field of the fixed position reader 10 so that the reading window 15 is perceived by the user in its entirety as a background object.

In this situation, the window rim 15a and the housing portions 11a adjoining the window rim 15a lie in the peripheral zone of the visual cone, but still well within it.

The so positioned visual indication 18 gives an immediately perceived feedback without the necessity of any eye movement in that the peripheral view is used. Furthermore, it is also assured that the visual indication 18 is not hidden by the check counter or the object to be scanned or by the user's arms.

Preferably, the visual indication 18 is of a different color from that of the light used to read, be it laser or a LED flash. In this way, attention is captured by the actual presence of a source of light, of a different color and within the user's visual cone. The window rim 15a and the housing portions 11a adjoining the window rim 15a lie in a zone where attention is not focused during the reading operation.

Thus, a visual indication 18 of the reading result appearing on at least a portion of the window rim 15a or on a portion 11a of the housing 11 adjoining the window rim 15a and placed on the right or left hand side of or below the reading window 15 distracts the user from staring for too long at the reading light (laser or flash) so as to interrupt continuous exposure to the reading light.

This effect is even higher in case of visual indication 18 of a different color from that of the light used to read.

Additionally, the visual indication can also be made slowly flashing or pulsating or temporally cycling through different colors during the reading operation, so as to keep the eye distracted from fixing the intense laser or LED flashlight used for reading.

This avoids the user focusing its maximum acuity visual cone area in the zone where the most intense reading light is shed.

From the above description the features of the fixed position reader of coded information according to the present invention so as its related advantages are clear.

Further alternatives of the above described embodiments are still possible without departing from the teachings of the invention.

It is finally clear that the so designed fixed position reader of coded information can be submitted to many changes and variations all within the invention; furthermore all the details can be replaced with technically equivalent elements. In practice, all the used materials and the dimensions can be varied according to the technical requirements without departing from the invention.

What is claimed is:

1. A fixed position reader of coded information comprising a housing provided with a reading window having a peripheral rim, said housing comprising:
   a device inside said housing for reading coded information which generates a reading field projecting through said reading window towards the outside of said housing; and
   a visual indication device for visually indicating a reading result to a user, wherein said visual indication device generates a visual indication appearing on a central portion of said reading window, and wherein a housing portion is at least on the left hand side of said reading window, right hand side of said reading window, or below said reading window.

2. The fixed position reader of coded information according to claim 1, wherein said visual indication device comprises at least one light source which generates a light beam guided through a light guide around at least a portion of said peripheral rim of said reading window.

3. The fixed position reader of coded information according to claim 1, wherein said visual indication device comprises a plurality of light sources disposed behind a diffusive screen peripherally surrounding at least a portion of said reading window at its peripheral rim.

4. The fixed position reader of coded information according to claim 1, wherein said visual indication device comprises at least one light source which generates a light beam directed at a plurality of separated diffusing areas placed peripherally with respect to said reading window at its peripheral rim.

5. The fixed position reader of coded information according to claim 1, wherein said visual indication device comprises at least one light source oriented so as to generate a light beam collimated or moderately diverging and having an optical path directed towards said central portion of said reading window.

6. The fixed position reader of coded information according to claim 1, wherein said central portion of said reading window is made diffusive.

7. The fixed position reader of coded information according to claim 1, wherein said visual indication appears in a pulsating mode or temporally cycling through a sequence of different colors during the reading operation of said device for reading coded information.

8. The fixed position reader of coded information according to claim 1, wherein said visual indication device comprises at least one multicolor light source.

9. The fixed position reader of coded information according to claim 1, wherein said visual indication has a first color different from a second color of a light emitted by said device for reading coded information.

10. A fixed position reader of coded information comprising a housing provided with a reading window having a peripheral rim, said housing comprising:
    a device for reading coded information which generates a reading field projecting through said reading window towards the outside of said housing; and
    a visual indication device for visually indicating a reading result to a user, wherein said visual indication device generates a visual indication appearing on the whole of said reading window, and wherein a housing portion is at least on the left hand side of said reading window, right hand side of said reading window, or below said reading window.

11. The fixed position reader of coded information according to claim 10, wherein said visual indication device comprises at least one light source which generates a light beam guided through a light guide around at least a portion of said peripheral rim of said reading window.

12. The fixed position reader of coded information according to claim 10, wherein said visual indication device comprises a plurality of light sources disposed behind a diffusive screen peripherally surrounding at least a portion of said reading window at its peripheral rim.

13. The fixed position reader of coded information according to claim 10, wherein said visual indication device comprises at least one light source which generates a light beam directed at a plurality of separated diffusing areas placed peripherally with respect to said reading window at its peripheral rim.

14. The fixed position reader of coded information according to claim 10, wherein said visual indication device comprises at least one light source emitting a light beam towards said reading window along any optical internal path not interfering with an optical path emitted by said device for reading coded information.

15. The fixed position reader of coded information according to claim 10, wherein said visual indication appears in a pulsating mode or temporally cycling through a sequence of different colors during the reading operation of said device for reading coded information.

16. The fixed position reader of coded information according to claim 10, wherein said visual indication device comprises at least one multicolor light source.

17. The fixed position reader of coded information according to claim 10, wherein said visual indication has a first color different from a second color of a light emitted by said device for reading coded information.

18. A camera based checkout security system comprising:
at least a security checkout camera, wherein the security checkout camera generates a camera field of view directed towards a reading window of a fixed position reader of coded information; and
said fixed position reader of coded information comprising a housing provided with said reading window having a peripheral rim, said housing comprising:
a device for reading coded information which generates a reading field projecting through said reading window towards the outside of said housing; and
a visual indication device for visually indicating a reading result to a user, wherein said visual indication device generates a visual indication appearing on a central portion of said reading window, and wherein a housing portion is at least on the left hand side of said reading window, right hand side of said reading window, or below said reading window.

19. The camera based checkout security system according to claim 18, wherein said visual indication device comprises at least one light source oriented so as to generate a light beam collimated or moderately diverging and having an optical path directed towards said central portion of said reading window.

20. The camera based checkout security system according to claim 18, wherein said central portion of said reading window is made diffusive.

21. A camera based checkout security system comprising:
at least a security checkout camera, wherein the security checkout camera generates a camera field of view directed towards a reading window of a fixed position reader of coded information; and
said fixed position reader of coded information comprising a housing provided with said reading window having a peripheral rim, said housing comprising:
a device for reading coded information which generates a reading field projecting through said reading window towards the outside of said housing; and
a visual indication device for visually indicating a reading result to a user, wherein said visual indication device generates a visual indication appearing on the whole of said reading window, and wherein a housing portion is at least on the left hand side of said reading window, right hand side of said reading window, or below said reading window.

22. The camera based checkout security system according to claim 21, wherein said visual indication device comprises at least one light source emitting a light beam towards said reading window along any optical internal path not interfering with an optical path emitted by said device for reading coded information.

* * * * *